United States Patent [19]
Helms

[11] 3,849,636
[45] Nov. 19, 1974

[54] METHOD AND APPARATUS FOR DETERMINING THE POSITION OF A VEHICLE

[75] Inventor: Horst Helms, Bremen, Germany

[73] Assignee: Fried. Krupp Gesellschaft mit beschrankter Haftung, Essen, Germany

[22] Filed: Mar. 7, 1973

[21] Appl. No.: 338,823

[30] Foreign Application Priority Data
Mar. 8, 1972 Germany............................ 2211063

[52] U.S. Cl............ 235/150.27, 235/150.2, 340/24, 340/52 R
[51] Int. Cl........................................... G06f 15/50
[58] Field of Search..... 235/150.2, 150.27, 150.271; 33/318, 326

[56] References Cited
UNITED STATES PATENTS
3,364,343  1/1968  Hunt............................ 235/150.271
3,664,748  5/1972  Bezu.......................... 235/150.27 X FOREIGN PATENTS OR APPLICATIONS
2,012,985  10/1971  Germany...................... 235/150.27

Primary Examiner—Felix D. Gruber
Attorney, Agent, or Firm—Spencer & Kaye

[57] ABSTRACT

A method of determining the momentary position of a vehicle using a north-seeking gyrocompass for obtaining a direction indication in the longitudinal direction with respect to geographic north, by developing representations of movement components in the longitudinal and transverse directions of the vehicle and supplying data representing the position of the vehicle based on any known starting point. These representations are used to develop a new position determination, the steps of the method being cyclically repeated. The method can be performed using a measuring device and a settable data input device which supplies signals representative of any starting point. Signals from the gyrocompass, the measuring device and the input device are supplied to signal processing circuits which include, as the output member of the apparatus, a summing circuit having two outputs on which appear, respectively, signals representative of the longitude and latitude at which the vehicle is momentarily positioned.

14 Claims, 15 Drawing Figures

METHOD AND APPARATUS FOR DETERMINING THE POSITION OF A VEHICLE

BACKGROUND OF THE INVENTION

This invention relates to a method of and apparatus for determining the position of a vehicle relative to any desired known starting position. More particularly, the present invention relates to such a method and apparatus for employing a northseeking gyrocompass on board the vehicle for a directional indication of the longitudinal direction of the vehicle, with respect to the geographic north direction, as the north direction indication. The apparatus employs a measuring device on board the vehicle for measuring movement components over the ground in the longitudinal and transverse direction of the vehicle. The movement components are integrated thereby defining paths traveled. The paths traveled are transformed into path components in the north/south direction and the east/west direction, while employing the momentary north direction indication. The two path components are added to the starting position, consideration being given system error angles in the north direction indication which are typical for gyrocompasses in moving vehicles.

The position of a vehicle, for example a ship or an airplane, is determined by the geographical latitude and longitude of the earth. Among the classic astronomical aids for determining the momentary position of a vehicle is for example, a sextant to determine the course, the path traversed being determined by a measurement of the speed of the vehicle, which is integrated over the time period during which this path has been traversed.

In addition, various radio location systems are known, particularly the recent satellite navigation system and the longer known hyperbolic navigation system.

The determination of the position of, for example, a ship on the high sea with radio location systems is not always sufficiently accurate to meet requirements existing, for example, when surveying the profile of the bottom of the sea or when positioning or other research work is to be performed since, for example, the propagation of the electromagnetic waves over multiple paths produces errors in the position determination. Furthermore, the accuracy of the astronomical aids and radio location systems depends on weather conditions and the time of day. A particular drawback in the satellite navigation is the required waiting time until the satellite appears over that portion of the earth where the vehicle is located. In the meantime a position determination according to this method is not possible. Furthermore, additional devices are required on board the vehicle in practicing the satellite navigation method to record the speed and the course of the vehicle.

Movement measuring devices are used, in position determining apparatuses, to determine the path traveled as these devices are presently used principally in inertial navigation systems in the form of mechanical acceleration recorders on a stabilized platform. In the known Doppler navigation systems, the path travelled is determined from speed recorders which operate according to the reflected beam ranging principle.

In the determination of the course, the position or direction of the traversed path above ground is determined in geographical longitude and latitude, generally with reference to the geographical north direction which is indicated, for example, by a simple compass needle or a north-seeking gyrocompass on board the vehicle.

No land-independent navigation system is known which can be realized with expenses which are justifiable for commercial purposes and which permits the continuous determination of the exact position of a vehicle without any course errors since mechanically highly complicated stabilized gyrocompass systems which operate without significant errors even with moving vehicles are much too expensive and complicated for ordinary normal navigation purposes.

A known improvement, resulting in greater accuracy of the position determination, has been effected by the use of two movement measuring devices each employing a simple gyrocompass, i.e., a combination of an inertial navigation system with a Doppler navigation system as it is described in the German Laid Open Patent Application (Offenlegungsschrift) No. 1,923,884. Aside from the complicated movement measurement devices required, this combination of features has been found to be practically useless for position determinations over longer periods of time since its accuracy decreases over time.

For longer time period missions, for example those of ships which travel a path in an uncomparably longer time period than aircraft, a combination of an inertial navigation or Doppler navigation system, which operates independently of land, and a land-dependent radio location system is known, The principal advantage of this combination is that the effects of errors inherent to one system can be corrected by supporting measurements effected by means of the other system (see summary reports by Graefe and Maass "Ranging and Communications Methods", *Interocean* '70, *International Congress with an Exhibition for Ocean Research and Ocean Utilization*, Volume 1. The circuitry and the number of measuring devices required to record the movements of the vehicle and the data received from the radio location system are very complex because each system used in these combined systems belongs to a different art.

Supporting measurements with radio location systems can be eliminated the more accurate the continuous determination of the position is effected with the land-independent navigation system on board the vehicle.

In a usual case, the land-independent navigation system includes movement measuring devices and a north-seeking gyrocompass, which are both installed on board the vehicle. The accuracy of the position determination, in all land-independent navigation systems, is determined essentially solely by the quality of the movement measuring devices and the errors in the north direction indication of the north-seeking gyrocompass.

For accurate measurements of the movement component in the longitudinal and transverse direction of the vehicle movement, measuring devices are known which are used in inertial navigation systems to measure the acceleration and in Doppler navigation systems to measure the speed. The greatest source of errors in both systems, however, is the north-seeking gyrocompass used in both systems for the indication of the north direction, aside from the additional errors in the horizontal stabilization of the platform carrying the acceleration recorders in the inertial navigation system.

Every vehicle maneuver, i.e. every change in the movement of the vehicle, produces an error in the north direction indication of the gyrocompass since additional forces originating from the speed and acceleration of the vehicle act upon the gyrocompass in such a case. These forces produce errors in the north direction indication in the azimuth plane as well as in the elevational plane. These errors are known as the so-called system error angles of the gyrocompass.

The north direction indication of the gyrocompass is an angular indication between the longitudinal direction of the vehicle and the figure axis of the gyrocompass. This angle is equal to the angle between the longitudinal direction and geographic north only when the vehicle is standing still and the gyrocompass is in its balanced state. The north direction indication is falsified at once, however, by system error angles whenever the vehicle moves either with a constant speed or undergoes velocity changes (acceleration). In order to determine the true angle between the geographic north direction and the longitudinal direction of the vehicle, the system error angles must be determined based on vehicle movements. These system error angles are time-dependent parameters whose behavior is described in motion equations known in gyrophysics. These motion equations define the functional relationships between the momentary system error angles and the speed as well as acceleration of the vehicle in the north/south and east/west direction which are described, for example, for the north-seeking gyrocompass in the following articles appearing in the German publication "Sonderdrucke aus dem Ingenieurarchiv" (Special Reprints from the Engineer's Archives): *Kreiselmechanik des Anschuetz-Raumkompasses* (Gyromechanisms in the Anschuetz space compass), Volume VI, 1935; and *Kreiselkompass und Schiffsmanoever* (Gyrocompass and ships' movements), Volume IV, 1933.

These system error angles very considerably reduce the accuracy of the north direction indication of the north-seeking gyrocompass particularly when the vehicle continuously changes its course, as for example is surveying work, so that the gyrocompass is seldom or never in its fully balanced state. In surveying work it is particularly important that the position of the vehicle be accurately known at any time since, for example when surveying the ocean, an accurate depth indication can be evaluated accurately only when the associated information about geographical latitude and longitude, i.e. the momentarily associated position of the surveying vehicle, is known precisely.

SUMMARY OF THE INVENTION

It is an object of the present invention to provide a method as well as an apparatus for performing the method, which makes it possible to start with a known position and continuously determine substantially the exact momentary position of a vehicle in spite of any movements the vehicle might make and substantially to eliminate system error angles in the north direction indication of the north-seeking gyrocompass.

Methods are known per se which at least reduce these system error angles in the north-seeking gyrocompass, see, for example, the paper *Neuartiges Kreiselkompassystem fuer Marineanwendungen* (Novel gyrocompass system for maritime applications), published in the magazine "Wehr and Wirtschaft" (Arms and Economics) 6 — 1971.

These known methods, in addition to the movement measuring device which is available anyhow, and the navigation computer connected thereto to determine the position of the vehicle, require a substantially larger amount of special movement recorders and often even access to the mechanical structure of the gyrocompass; see, for example, German Auslegeschrift (Published Patent Application) No. 1,303,495. Navigational computers per se are known; see German Offenlegungsschrift, (Laid Open Patent Applications) No. 2,030,921 which, in addition to calculating the position, compensate for a magnetic misdirection of the north-seeking gyrocompass based on the differing positions of the geographic north pole and the magnetic north pole.

Within the scope of the above-described aim and objective, it is also intended to eliminate substantially system error angles of the north-seeking gyrocompass with as little additional circuitry as possible and without interfering with the movement of the gyrocompass.

The above-mentioned object, as well as others which are to become clear from the text below, are accomplished according to the present invention by a method of determining the position of a vehicle based on any desired known starting position using a north-seeking gyrocompass on board the vehicle for a directional indication of the longitudinal direction of the vehicle with respect to geographic north as the north indication. The method involves employing a motion measuring device on board the vehicle for developing movement components above ground in longitudinal and transverse directions of the vehicle, integrating the movement components into a representation of the path traveled, transforming the path traveled representation into path components in the north/south and east/west direction while employing the momentary north indication and adding the two path components to the starting position, while giving consideration to system error angles typical for gyrocompasses in the north direction indication of a moving vehicle. Additional characteristic steps of the improved method include deriving speed components ($Vli, Vqi$) in the longitudinal and transverse directions ($l, q$) of the vehicle (F) from the movement components;

using the speed components ($Vli, Vqi$) to determine the amount of the resulting speed Vres $i$, $i=1,2,\ldots,n$) of the vehicle (F) and a speed angle ($\gamma i$) between the direction of the resulting speed (Vres $i$) and the longitudinal direction ($l$) of the vehicle (F);

using the speed angle ($\gamma i$), the resulting speed (Vres $i$), the geographic latitude ($\phi i-1$) of the position occupied at a time interval ($\tau$), before the present instant, the known starting position ($\phi o, \lambda o$) and the north direction indication ($\beta i$) of the gyrocompass (2), and combining these values according to trigonometric relationships which are known per se in the navigation art, to determine a momentary speed ($VN'i$) of the vehicle (F) in the approximate north direction ($N'i$) and a momentary speed ($VO'i$) in the approximate east direction ($O'i$);

forming a difference quotient from a speed ($VN''i-1$) in the approximate north direction ($N'i-1$) which had been obtained before the time interval ($\tau$), minus the momentary speed ($VN'i$) in the approximate north direction ($N'i$) with respect to the time interval ($\tau$), the difference quotient being equal to a momentary acceleration ($bN'i$) of the vehicle (F) in the approximate north direction ($N'i$);

deriving a further difference quotient from a speed ($VO'i-1$) in the approximate east direction ($O'i-1$) which had been obtained before the time interval ($\tau$) minus the momentary speed ($VO'i$) in the approximate east direction ($O'i$) with respect to the time interval ($\tau$), said difference quotient being equal to a momentary acceleration ($bO'i$) of the vehicle (F) in the approximate east direction ($O'i$);

using the speeds ($VN'i$, $VO'i$) and the accelerations ($bN'i$, $O'i$) in the approximate north direction ($N'i$) and in the approximate east direction ($O'i$) and the geographic latitude ($\phi i-1$) of the position ($\phi i-1$, $\lambda i-1$, $i=1$; starting position: $\phi o$, $\lambda o$) occupied before the time interval ($\tau$), according to movement equations known from gyrophysics to determine system error angles ($\alpha i$, $\rho i$, $\sigma i$), to determine the momentary system error angle ($\alpha i$) in the azimuth plane;

combining this system error angle ($\alpha i$), the speed angle ($\gamma i$) and the north direction indication ($\beta i$) of the gyrocompass (2) and to form the true directional angle ($\eta i$) between the geographic north direction (N) and the direction of the resulting speed ($Vres\ i$); and using this true directional angle ($\eta i$) and the resulting speed ($Vres\ i$) of the vehicle (F), after integrating over the time interval ($\tau$) to produce a resulting path ($sres\ i$), the path components ($sNi$, $sOi$) in the north/south direction (N) and in the east/west direction (O) by coordinate analysis to which is added the position ($\phi i-1$, $\lambda i-1$; $i=1$; starting position = $\phi o$, $\lambda o$) occupied before the time interval ($\tau$) to produce the momentary position ($\phi i$, $\lambda i$) of the vehicle (F).

The above-mentioned object, as well as others which are to become clear from the text below, is also accomplished according to the present invention by providing an apparatus for determining the position of a vehicle on which it may be positioned which apparatus includes a motion responsive device for developing motion components in longitudinal and transverse directions of the vehicle, a north-seeking gyrocompass and a data input device which supplies data indicative of a starting position of the vehicle. A navigational computer is provided for determining in cyclic sequences the momentary position of the vehicle. The navigational computer is particularly programmed for processing trigonometric functions. Inputs of the navigational computer are coupled to the data input device and to the motion responsive device, the computer being responsive to outputs received therefrom. The navigation computer also includes (1) a further input, (2) a calculating circuit which is connected to the movement measuring device for developing momentary resulting speed signals in response to outputs from the movement measuring device. A system error computer is coupled to the gyrocompass and responds to output therefrom for deriving directional indication. This computer is programmed for motion equations of the error system angles of the north seeking gyrocompass as they are known from gyrophysics. An addition circuit having three inputs coupled respectively to the error angle computer, the gyrocompass and the speed angle circuit responds to signals from these members. An output from the addition circuit is coupled to the further input of the navigational computer.

In the method according to the present invention a correction of the north direction indication of the north-seeking gyrocompass is derived only from the parameters which are measured anyhow by the movement measuring device for the position determination, i.e. from the motion component in the longitudinal direction and in the transverse direction of the vehicle. Additional measuring value recorders which determine, for example, additional acceleration components of the vehicle when the movement measuring device compiles speed components are consequently no longer required, in contradistinction to the known methods for correcting the north direction indication of the north-seeking gyrocompass. Computer circuits for determining the system error angle do not constitute significant additional circuitry since the computer circuits already are required for the position determination and are part of the navigational computer system where they can be easily modified to perform further computing operations.

A particular advantage of the solution provided by the present invention is that, in spite of the limited circuitry which is adapted to commercial purposes, it is possible to perform an extremely accurate and uninterrupted position determination for the vehicle, this determination being independent of any land stations. It is moreover very favorable that the method is not designed for one particular type of gyro, but that any design of a gyrocompass and particularly a simple north-seeking gyrocompass in its most inexpensive form can be used for this accurate position determination. The determination is independent of whether the gyrosystem is undamped or has any kind of damping. This is the case because the sequence of movement of the gyrocompass is not interfered with in the present invention, but rather the north direction indication of the gyrocompass is corrected in a separate addition circuit so that, in contradistinction to the known methods, the method is not only less expensive but also more dependable.

The above-mentioned motion components with reference to the vehicle which represent, in dependence on the selected motion measuring device, acceleration or speed components in the longitudinal and transverse direction of the vehicle are used not only, as before, to determine, via integration, the resulting path traversed by the vehicle but also, according to the present invention, to determine momentary system error angles in the north direction indication of the north-seeking gyrocompass according to motion equations known from gyrophysics.

These motion equations provide the time dependence of the system error angles on the speed and acceleration of the vehicle in the north/south direction and east/west direction. To solve these motion equations it would thus actually be necessary to separate the speed and acceleration of the vehicle into components whose directions identify the north/south and east/west directions. Since these exact north/south and east/west directions are the ones to be determined, however, i.e. are unknown at first, the present invention is based on an approximate north direction and an approximate east direction to which the resultant speed and acceleration are then related. This approximate north and approximate east direction is derived from a first auxiliary parameter plus a course error. The first auxiliary parameter is equal to the north direction indication of the gyrocompass plus a system error angle as determined during the most recent time interval, which in the first time interval (rest position of the vehicle) equals zero, and minus a momentary speed angle. The speed angle lies between the resulting speed of the vehicle and its longitudinal direction and is determined from the motion components with reference to the vehicle. The course error, which as such is known in the navigation art, is calculated as the first system error angle from the first auxiliary parameter under consideration of the peripheral speed of the earth at the last maintained position and the resulting speed of the vehicle, using relationships between these parameters which are known in the navigation art. Course errors and the first auxiliary parameter then rsult in an angle between the direction of the resulting speed of the vehicle and the approximate north direction with which the speed in the approximate north direction and in the approximate east direction can then be determined.

The accelerations in the approximate north and the approximate east directions are derived by the formation of a difference quotient between two speeds in the approximate north direction and the approximate east direction derived one time interval apart, each with reference to the time interval.

Accelerations and speeds in the approximate north and east direction are inserted into the motion equations of the north-seeking gyrocompass and the solutions provide the momentary system error angles in the azimuth and elevation plane.

In special cases the system error angles in the elevation plane are not used to correct the north direction indication of the north-seeking gyrocompass, but the system error angle in the azimuth plane is considered in every case, this angle providing, considered with the north direction indication of the north-seeking gyrocopass, a true angle between the geographic north and the longitudinal direction of the vehicle. This true angle alone does not give any information about the direction of movement of the vehicle which is of interest with respect to the geographic north. Only the difference between the true angle and the speed angle provides the directional angle which actually lies between the direction of movement of the vehicle and the geographic north. The direction of movement and the direction of the path traveled by the vehicle are identical, and the resulting path is separated with the aid of the directional angle into earth-related path components in the north/south and east/west directions. These path components are added to the most recently determined position, a first known position (e.g. at the start of the trip of a ship, the port entrance) being the starting position.

The difference between the system error angles in the azimuth plane derived from the motion equations for the most recent time interval and the course error obtained in the most recent time interval results for the new time interval, for which the new position is determined, together with the new north direction indication of the gyrocompass and with the newly determined speed angle, in the new first auxiliary parameter from which the new course error is determined. The first auxiliary parameter and the new course error are used to calculate, together with the resulting speed, new speeds and accelerations in the approximate north and east directions from which, when they are inserted into the motion equations, the new system errors are determined.

Using this technique, it is possible to obtain in given time intervals, i.e. practically without interruption, a continuous accurate position indication for a vehicle. The position indication is effected merely from the data obtained from a movement measuring device and from a simple north-seeking gyrocompass.

An apparatus according to an embodiment of the present invention includes a movement measuring device for the motion components of the vehicle, a data input indicative of the starting position of the vehicle, a north-seeking gyrocompass and a known navigational computer of the type conventionally employed on board vehicles, which computer is programmed in particular for processing tirgonometric functions. Before being fed into the navigational computer, the north direction indication of the north-seeking gyrocompass is combined in an addition circuit with a starting value from a system error computer, i.e. the system error angle, and the system angle computer is programmed for the motion equations known from gyrophysics for system error angles of the north-seeking gyrocompass and is connected at its input with an angle output for the north direction indication of the gyrocompass, as well as with the movement measuring device via a speed angle circuit for forming the speed angle and via an arithmetic circuit or device which forms the momentary resulting speed within the navigational computer.

In the navigational computer, a calculating circuit or device which is connected with the movement measuring device determines the resulting speed of the vehicle. If the movement measuring device is a Doppler navigation system, its output provides the speed components in the longitudinal and transverse direction of the vehicle which are then fed directly to the calculating circuit or device. If the movement measuring device is an inertial navigation system, the measured motion components are vehicle-related acceleration components which, upon integration over the time interval, are fed to the calculating circuit or device.

Also provided in the navigational computer is the speed angle circuit which is connected, in parallel with the calculating circuit or device to the movement measuring device. The speed angle circuit contains a quotient former and a computer circuit which is programmed with a trigonometric function so that its output provides the speed angle.

The speed angle, the north direction indication and the system error angle obtained from the system error angle computer are summed in the addition circuit to provide the directional angle which is fed to a logic circuit in the navigational computer.

In the logic circuit the resulting speed is integrated over the time interval to indicate the resulting path traveled by the vehicle and is separated, together with the directional angle into path components in the north/south and east/west direction by conventional techniques involving trigonometric relationships.

In the summing circuit which is connected at its input from the logic circuit and the data input for the starting position, the momentary path components are added to the most recently determined position. The momentary position of the vehicle appears at the output of the summing circuit.

In the system error angle computer there is at its input a summing circuit which is connected from the angle output of the gyrocompass and the speed angle circuit for forming the first auxiliary parameter. From the resulting speed, the first auxiliary parameter and the geographic latitude of the most recently determined position at the output of the summing circuit in the navigational computer, a computer circuit determines the first system error angle, i.e. the course error. The computer circuit and the summing circuit are connected in series with an adder stage which is connected to a first input of a speed former circuit which has its second input connected to the calculating circuit or device. In the speed former circuit, computing stages, which are programmed with trigonometric functions and multiplier circuits, each determine a speed for the vehicle in the approximate north and in the approximate east direction. In a series-connected difference quotient circuit including two scanners, delay members and comparators (difference formers), the speeds are converted into accelerations of the vehicle in the approximate north direction and the approximate east direction and are fed to a partial computer which is programmed with the motion equations. This partial computer furnishes the system error angles which in the addition circuit produce the true directional angle together with the speed angle and the north direction indication.

The advantage of the apparatus of the present invention for performing the method is particularly that a system error angle computer is connected to the known navigational computer without any modifications being required to the readily available and easily provided navigational computer. This system error angle computer includes simple programmed computer circuits which perform mathematical operations, such as summation, multiplication, division and the formation of trigonometric functions. Only the special partial computer within the system error angle computer requires complicated circuits which are wired according to the motion equations for the north-seeking gyrocompass.

It is of course also possible to use the system error angle computer alone without the entire navigational computer system in order to correct the north direction indication of the gyrocompass during vehicle movements, if the furnishing of position indications is not as important as an always highly accurate north direction indication of the gyrocompass.

It is possible to display the first system error angle, i.e. the course error, by a known device, i.e. the so-called "delta instrument"; however, a special computer circuit is particularly advantageous within the scope of the present invention because it includes computing stages, which are programmed with the cosine function and with the sine function, a ratio former, a factor former and a dividing circuit which is connected in series to a computing stage programmed with the arc sine function. This solution is must less complicated than a separate auxiliary navigation instrument since the necessary auxiliary circuits (e.g. clock pulse source) are readily available.

According to a further embodiment of the present invention it is possible to determine in the partial computer of the system error angle computer only the system error angles based on the acceleration of the vehicle in the approximate north direction and in the approximate east direction; then the previously derived course error and the system error angle which is dependent only on the acceleration are added in the adder circuit to the north direction indication of the gryocompass and the speed angle to determine the directional angle. The advantage is that the circuitry in the partial computer is not as complicated as it otherwise would be because the speed information which has already been utilized in the determination of the course error is not processed therein.

DESCRIPTION OF THE PREFERRED EMBODIMENTS

Figure 1:
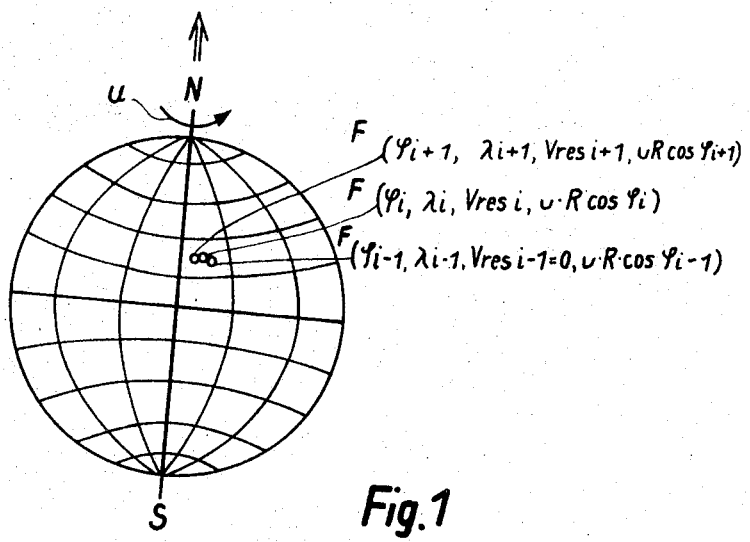
FIG. 1 is a diagrammatic representation of the earth showing various positions of a vehicle.

FIG. 1 diagramatically shows the earth rotating at a speed (velocity) $u$ about its axis of rotation N/S, the latitudinal degrees of the earth being stereographically drawn. A vehicle F is disposed at a starting position $\phi o, \lambda o$ which is defined by the geographical latitude $\phi o$ and the geographical longitude $\lambda 0$. The starting position $\phi o, \lambda o$ according to the method of the invention is always selected to be a known position. If the vehicle F is a ship, the starting position is the entrance to a specific port, for example. At the starting position $\phi o, \lambda o$ the vehicle F has a resultant speed Vres $i-1(i=1)$ which is equal to zero. The peripheral speed of the earth at this position is $u \cdot R \cdot \cos\phi i-1(i=1)$, R being the radius of the earth. After a time interval $\tau$ the vehicle F has moved at a resulting speed Vres $i$ to a position $\phi i,$-

$\lambda i(i=1, 2, \ldots, n)$. The peripheral speed of the earth at this position is $u \cdot R \cdot \cos \phi i$. Again after a time interval $\tau$ the vehicle F has moved with a resulting speed Vres $i+1$ to the momentary position $\phi i+1$, $\lambda i+1(i=1, 2, \ldots, n)$ at this point on the earth the peripheral speed is $u \cdot R \cdot \cos \phi i+1$. The distances between the individual positions $\phi i, \lambda i(i-1, 2, \ldots, n)$ from one another are very small compared to the dimensions of the earth. The time interval $\tau$ at which the position $\phi i, \lambda i$ has been occupied is selected to be short enough so that movement between two positions $\phi i$, $\lambda i; \phi i+1$, $\lambda i+1$ can be considered linear.

In order to determine the momentary position $\phi i, \lambda i$ of the vehicle F according to the method of the present invention, motion components in the longitudinal and transverse direction of the vehicle F are measured after each time interval by means of a movement measuring device on board the ship F. Moreover, a north-seeking gryocompass is provided on board the ship F to provide a directional indication between the longitudinal direction of the vehicle F and the geographic north direction N as the north direction indication.

Figure 2:
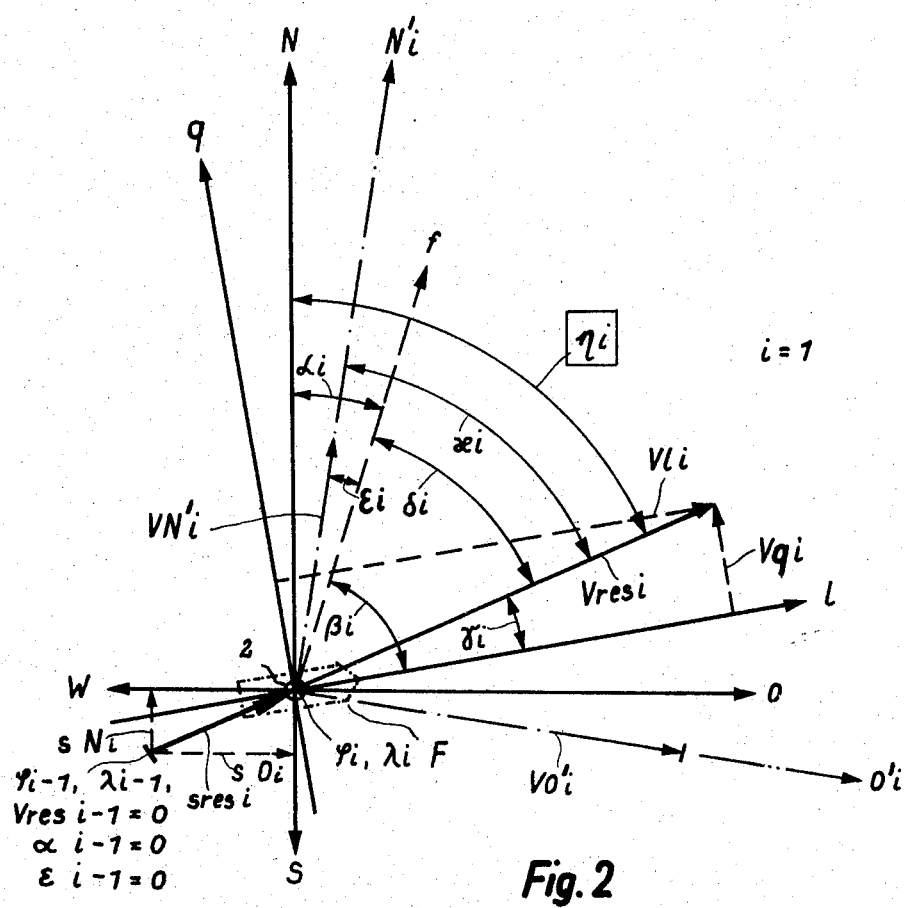
FIG. 2 is an illustration of an earth-related coordinate system showing angle indications for a momentary position of a vehicle at a given point in time.

FIG. 2 is a diagrammatical representation of an earthrelated coordinate system having coordinate axes N/S and O/W which represent the north/south direction and the east/west direction on the earth from a position $\phi i \lambda i$. Vehicle F is disposed at position $\phi i$, $\lambda i$. The longitudinal direction $l$ of the vehicle F and its transverse direction $q$ also define a rectangular coordinate system which, however, is shifted by an angle with respect to the earth-related coordinate system, the angle being combined of a directional angle $\eta i$ and a speed angle $\gamma i$. In order to determine the momentary position $\phi i$, $\lambda i$ of the vehicle F, speed components V$li$ and V$qi$ in the longitudinal and transverse directions $l$, $q$ of the vehicle F are registered by the movement measuring device. These two speed components V$li$, V$qi$ determine the resulting speed Vres $i$ of the vehicle F at the momentary position $\phi i$, $\lambda i$. The resulting speed Vres $i$ results from the speed imparted to the vehicle F by its engines and a drift resulting from the environmental conditions of the vehicle F; therefore, the direction of the resulting speed Vres $i$ does not point in the direction of the longitudinal direction $l$ of the vehicle F, but is shifted with respect to this direction by the speed angle $\gamma i$. This speed angle $\gamma i$ can be obtained from the speed components V$li$, V$qi$ by trigonometric conversion.

The north direction indication $\beta i$ of a gryrocompass 2 is constituted on board the vehicle F by an angle between the longitudinal direction $l$ of the vehicle F and a figure axis $f$ of the gyrocompass 2. This angle as the north direction indication $\beta i$ is only then equal to the directional angle $\eta i$ plus the speed angle $\gamma i$, when the vehicle F is not moving and the gyrocompass 2 is in its balanced state. The north direction indication $\beta i$ is falsified at once, however, when the vehicle F moves at a constant resulting speed Vres $i$ or accelerates. The sum of the north direction indication $\beta i$ and the system error angle $\alpha i$ minus the speed angle $\gamma i$ equals the directional angle $\eta i$ between the resulting speed Vres $i$ and the geographic north N. With the aid of this directional angle $\eta i$ and integration of the resulting speed Vres $i$ with the resulting path sres $i$ the momentary $\phi i$, $\lambda i$ of the vehicle F is determined.

The resulting path sres $i$ is the connection between the momentary position $\phi i, \lambda i$ and the most recently determined position $\phi i-1$, $\lambda i-1$ of the vehicle F for which $i$ is equal to the starting position $\phi o, \lambda o$. At the starting position $\phi o, \lambda o$ the vehicle F has a resulting speed Vres $i-1=0$ and the system error angle is also $\alpha i-1=0$ and the course error $\epsilon i-1=0$ so that the north direction indication $\beta o$ at the starting position $\phi o, \lambda o$ is equal to the directional angle $\eta o$.

If the vehicle F moves from the starting position $\phi o, \lambda o$ at constant speed Vres $i$ to the position $\phi i, \lambda i$, the figure axis $f$ of the gyrocompass 2 moves from the direction of geographic north N about a system error angle which is also known as the course error $\epsilon i$. If the vehicle F moves on the resulting path sres $i$ from the starting position $\phi o, \lambda o$ to the position $\phi i, \lambda i$ with constant acceleration, a system error angle $\alpha i$ will result about which the figure axis $f$ moves away from geographic north N. As a result, the system error angle $\alpha i$ has the value shown in FIG. 2 if the vehicle F is at the position $\phi i$, $\lambda i$. The reason for the movement of the figure axis $f$ away from geographic north N, due to maneuvers by the vehicle F, is a known phenomenon in gyrocompasses since the rotation $u$ and the gravity $g$ of the earth on which the direction-seeking and the direction-maintaining properties of the north-seeking gyrocompass are based are superimposed with the speed and acceleration of the vehicle F.

The problem is to determine this deflection of the axis $f$ of FIG. 2 by the system error angle $\alpha i$, or by the course error $\epsilon i$ at a constant speed Vres $i$. According to the pressent invention this is accomplished using the motion components of the vehicle F according to the following procedure: The course error $\epsilon i$ is determined as the first system error angle in that a first auxiliary parameter $\delta i$ is derived as the difference between the north direction indication $\beta i$ and the speed angle $\gamma i$. This first auxiliary parameter $\delta i$, the resulting speed Vres $i$ of the vehicle F and the peripheral speed of the earth $u \cdot R \cdot \cos \phi i-1$ at the most recently determined position $\phi i-1$, $\lambda i-1$ are converted according to the equations known in the navigation art (see Meldau-Steppes, "Lehrbuch der Navigation" (Textbook for Navigation), Chapter 6.11, Arthus Geist Verlag, Bremen, Germany, 1958) to provide the course error $\epsilon i$ as the first system error angle.

The other system error angle $\alpha i$ is determined according to the motion equations known in gyrophysics from a determination of the speed and acceleration in the geographical north direction N. For this purpose an approximate north direction $N'i$ is derived from the sum of the first auxiliary parameter $\delta i$ and the course error $\epsilon i$ which is illustrated in FIG. 2 as the second auxiliary parameter $\chi i$ since, as already mentioned above, the system error angle $\alpha i-1(i=1)$ and the course error $\epsilon i-1(i=1)$ are always zero at the starting position $\phi o, \lambda o$ because it is assumed that the gyrocompass 2 is in the balanced state at that point.

Together with the second auxiliary parameter $\chi i$ the resulting speed Vres $i$ is separated into two speeds V$N'i$, V$O'i$ in the approximate north direction $N'i$ and the approximate east direction $O'i$. From these two speeds V$N'i$, V$O'i$ the difference quotient is formed to determine the accelerations $bN'i$, $bO'i$ in the approximate north direction $N'i$ and in the approximate east direction $O'i$. The speeds V$N'i$, V$O'i$ and the accelerations $bN'i$, $bO'i$ in the approximate north direction $N'i$ and the approximate east direction $O'i$ are inserted into the motion equation, the result of which is the system error angle $\alpha i$.

The sum of the north direction indication $\beta i$, the system error angle $\alpha i$ minus the speed angle $\gamma i$ results in the desired, geographically accurate directional angle $\eta i$ between the resulting speed Vres $i$ or the resulting traveled path $s$res $i$ of the vehicle F, respectively, and the geographic north direction N.

Figure 3:
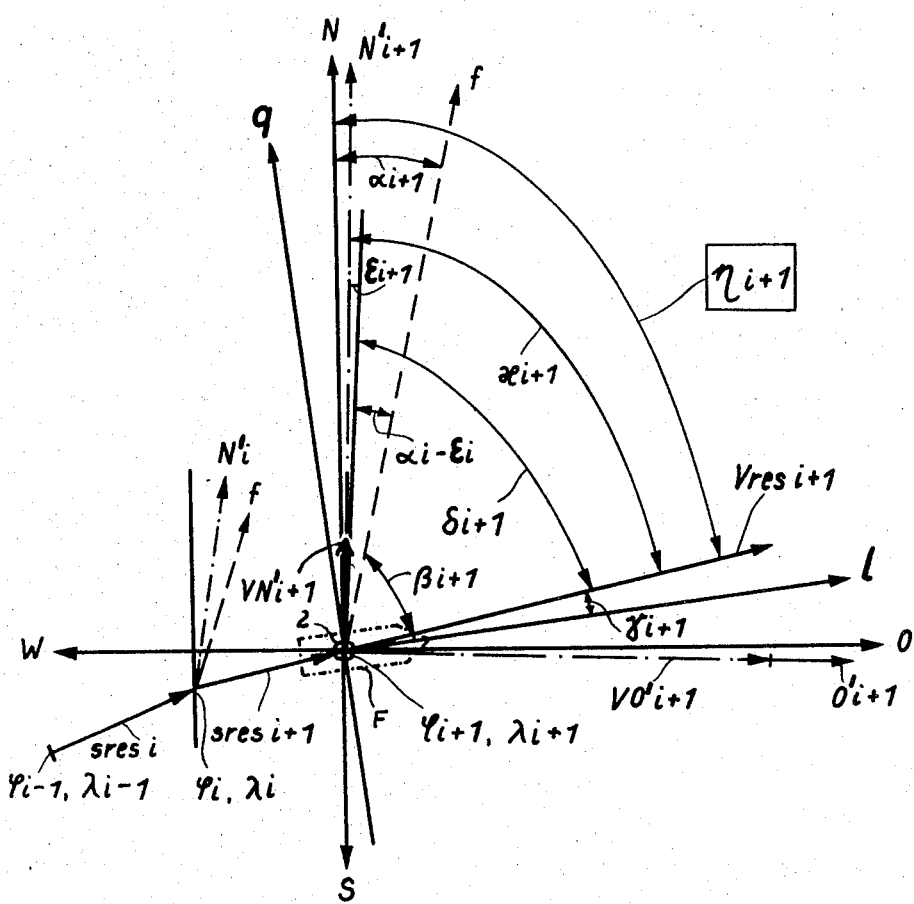
FIG. 3 is an illustration of an earth-related coordinate system showing angle indications for the position of the vehicle of FIG. 2 as determined one time interval later than the given point in time.

After each time interval $\tau$ new speed components V$li$, V$qi$ and the north direction indication $\beta i$ of the gyrocompass 2 are obtained. FIG. 3 shows the angular conditions one time interval $\tau$ later than the point in time represented in FIG. 2 for the next position $\phi i+1, \lambda i+1$ of the vehicle F. These angular relationships now differ from those of FIG. 2 because the system error angles $\alpha i, \epsilon i$ at the position occupied before time interval $\tau$ are not equal to zero. The vehicle-related speed components V$qi+1$, V$li+1$ are used to determine the resulting speed Vres $i+1$ of the vehicle F at the position $\phi i+1, \lambda i+1$ of the vehicle F. The resulting speed Vres $i+1$ encloses a speed angle $\gamma i+1$ with the longitudinal direction $l$ of the vehicle F. To provide the first auxiliary parameter $\delta i+1$, a difference is formed from the system error angles $\alpha i, \epsilon i$ which were determined within the most recent time interval $\tau$ during the determination of the position $\phi i, \lambda i$ (FIG. 2). Furthermore, the difference from the new north direction indication $\beta i+1$ and the speed angle $\gamma i+1$ is formed. The sum of these two differences $\alpha i - \epsilon i$ and $\beta i+1 - \gamma i+1$ is the first auxiliary parameter $\delta i+1$. From this first auxiliary parameter $\delta i+1$, the resulting speed Vres $i+1$ and the peripheral speed $u \cdot R \cdot \cos\phi i$ at the most recently determined position $\phi i$, $\lambda i$ the new course error $\epsilon i+1$ is determined according to the known relationships in the navigation art, which is then added to the first auxiliary parameter $\delta i+1$ and provides the second auxiliary parameter $\omega i+1$. With the second auxiliary parameter $\omega i+1$ the resulting speed Vres $i+1$ is then again divided into speed VN$'i+1$ in the approximate north direction N$'i+1$ and in the approximate east direction O$'i+1$ which is perpendicular thereto. From the difference of the new determined speeds VN$'i+1$, VO$'i+1$ and the speeds VN$'i$, VO$'i$ determined before a time interval $\tau$ with reference to the time interval $\tau$ accelerations are formed in the approximate north and east direction N$'i+1$, O$'i+1$ with which, under consideration of the speeds VN$'i+1$, VO$'i+1$, by solving the motion equation the new system error angle $\alpha i+1$ between the geographic north direction N and the figure axis $f$ of the gyrocompass 2 is determined.

The north direction indication $\beta i+1$ of the gyrocompass 2 together with the system error angle $\alpha i+1$ minus the speed angle $\gamma i+1$ then again results in the directional angle $\eta i+1$, which lies between the geographic north direction N and the resulting speed Vres $i+1$ of the vehicle F.

Figure 4:
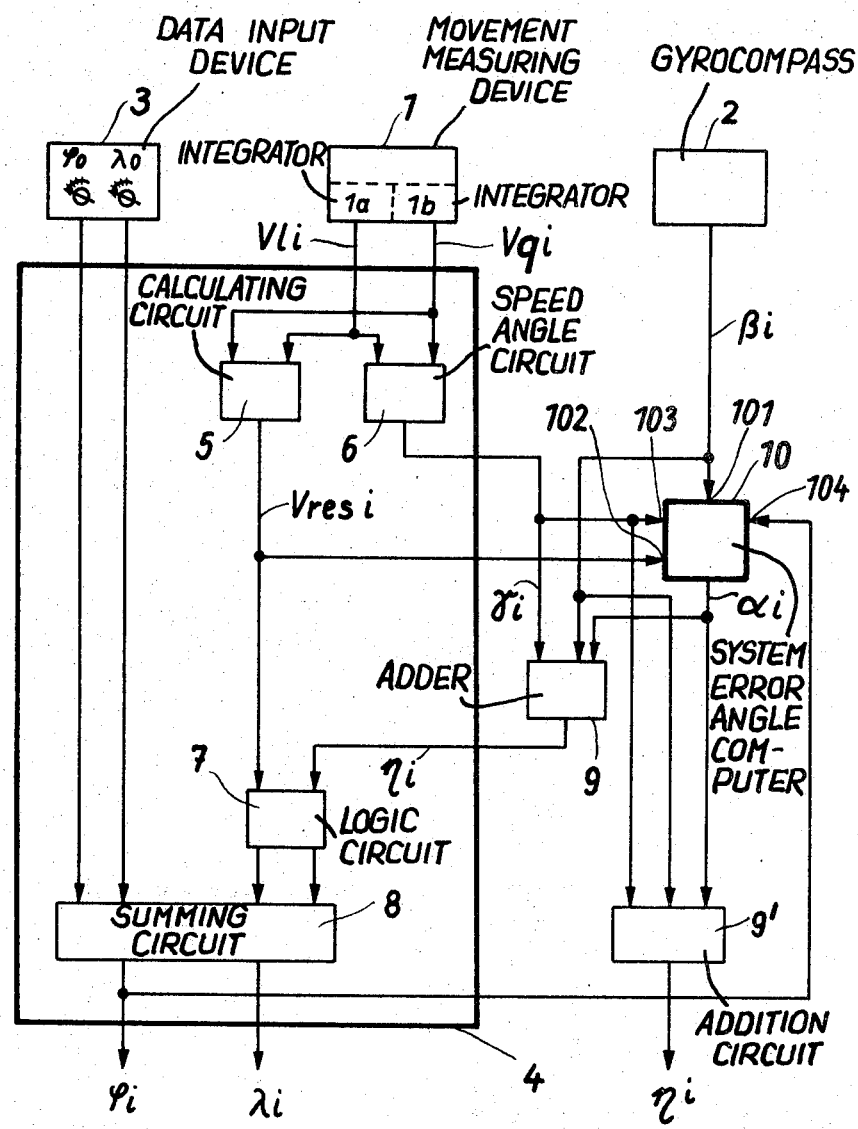
FIG. 4 is a block circuit diagram of an apparatus according to the present invention for performing the method of the present invention.

FIG. 4 illustrates an apparatus for performing the method of the present invention. A movement measuring device 1 is used to record the components of the motion of the vehicle F in the longitudinal and transverse directions l and q. This movement measuring device 1 may be either a stabilized platform having conventional acceleration sensors (recorders) as used in a conventional inertial navigation system or it may be a reflected beam ranging device operating according to the Doppler principle as used in conventional Doppler navigation systems. At the output of the movement measuring device 1 there appear two speed components V$li$, V$qi$. When vehicle acceleration components are recorded in the longitudinal and transverse directions $l$, $q$ these components are integrated over each time interval in two integrators 1$a$, 1$b$ to form the speed components V$li$, V$qi$, and when the motion components are recorded in the form of vehicle-related speed components the two speed components V$li$, V$qi$, in the longitudinal and transverse directions $l, q$ of the vehicle F are directly available at the two outputs from the movement measuring device 1.

The north direction indication $\beta i$ is obtained at an angle output of the north-seeking gyrocompass 2. In a settable data input device 3 the starting position $\phi o, \lambda o$ is set. Data input devices are well-known in the art and one such device is disclosed in U.S. application Ser. No. 886,562 filed by Jones et al. on Dec. 19, 1969, and now U.S. Pat. No. 3,725,919. This patent corresponds to German Offenlegungsschrift (Laid-Open Application) No. 2,062,575, laid open to the public on July 8, 1971. The movement measuring device 1 and the data input device 3 are connected respectively in series with a conventional navigational computer 4. Navigational computers are well-known in the art and one such system is disclosed in: M. Kayton et al., AVIONICS NAVIGATION SYSTEMS, pp. 94–112, John Wiley & Sons, Inc., New York (1969). This navigational computer 4 includes a calculating circuit or device 5 and a speed angle circuit 6, which both have their inputs connected from the outputs of the movement measuring device 1, a two-input logic circuit 7, whose one input is connected from the output of the calculating circuit 5 and whose other input receives the still undetermined directional angle $\eta i$, and a four-input summing circuit 8. Two outputs from the logic circuit 7 and two outputs from the data input device 3 are both connected to respective inputs of the summing circuit 8 at whose two outputs the geographic latitude $\phi i$ and longitude $\lambda i$ appear as the desired exact momentary position $\phi i, \lambda i$ of the vehicle F.

In order to produce the directional angle $\eta i$ a three-input adder circuit 9 has one input connected from a gyrocompass 2 and a second input from the output of the speed angle circuit 6 at whose output the speed angle $\gamma i$ is present. The third input of the adder circuit 9 is connected from an output of a system error angle computer 10 for receiving the system error angle $\alpha i$. An input 101 to the system error angle computer 10 is connected from the gyrocompass 2, its input 102 from the calculating circuit 5, its input 103 from the speed angle circuit 6 and its input 104 from one output from the summing circuit 8 for receiving the geographic latitude $\phi i$. The operation of the thus constructed device is that of the above-described method according to the present invention.

A further interesting application of the present invention, when no position determination for the vehicle F is required, lies in the possibility of doing without portions of the navigational computer 4 and determining only the exact directional angle $\eta i$. For this purpose, only the calculating circuit 5, the speed angle circuit 6 and the system error angle computer 10 are required in addition to the movement measuring device 1, the gyrocompass 2 and the data input device 3. Only those portions of the logic circuit 7 and the summing circuit 8 are used which are required to determine the geographic latitude $\phi i$, In an addition circuit 9' the speed angle $\gamma i$, the north direction indication $\beta i$ and the system error angle $\alpha i$ are added together to form the directional angle $\eta i$. A substantially greater circuit simplication can be attained in such an application in that merely the speed component $Vli$ in the longitudinal direction 1 of the vehicle F is determined with a simplified movement measuring device. From the simplified movement measuring device one speed component $Vli$, the north direction indication $\beta i$ and the most recently determined geographical latitude $\phi i -1$, the system error angle computer 10 determines only one system error angle $\alpha i'$ which together with the north direction indication $\beta i$ is equal to an approximate direction angle $\eta i'$ which is accurate enough for many fields of application. To determine the next system error angle $\alpha i+1'$ and thus the next approximate directional angle $\eta i+1'$ the speed component $Vli$ is integrated for determining the path traveled, and the path traveled is transformed with the aid of the directional angle $\eta i'$ to the path component $sNi$ in the north/south direction to obtain the new geographical latitude $\phi i$.

Figure 5:
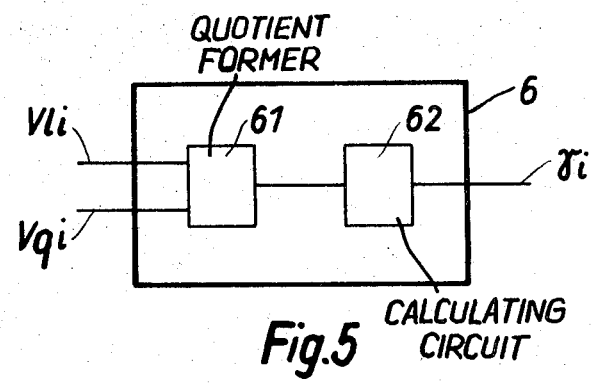
FIG. 5 is a block circuit diagram of a speed angle circuit within the navigational computer shown in FIG. 4.

FIG. 5 shows a circuit arrangement usable as the speed angle circuit 6. A quotient former 61, whose two inputs are connected respectively from the outputs from the movement measuring device 1, is connected in series with a calculating circuit 62 which is programmed with the arc tan function. At the output from the speed angle circuit 6 appears the speed angle $\gamma i$ between the longitudinal direction 1 of the vehicle F and the direction of the resulting speed Vres $i$.

Figure 6:
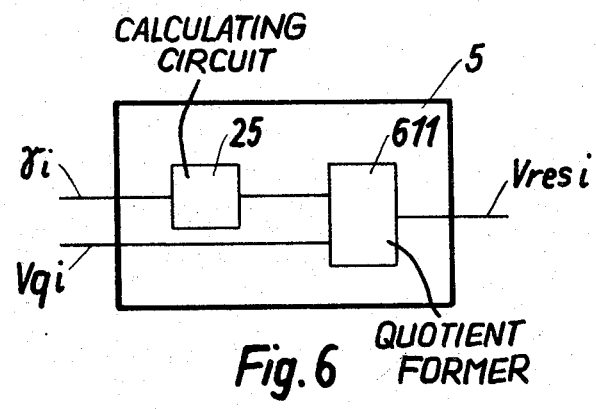
FIG. 6 is a block circuit diagram of a calculating circuit useable as the calculating circuit within the navigational computer according to FIG. 4.
Figure 7:
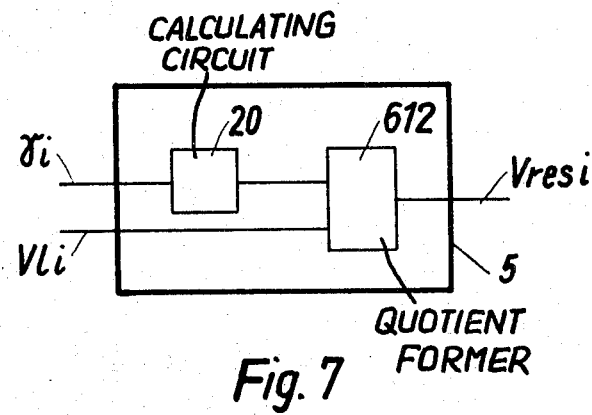
FIG. 7 is a block circuit diagram of a further circuit useable as the calculating circuit of FIG. 4.

The calculating circuit 5 forms, from the vehicle-related speed components $Vli$, $Vqi$, the resulting speed Vres $i$ of the vehicle F. This can be realized, for example, by a circuit which is programmed to form a geometric sum. Alternatively, this can be achieved by trigonomtrically linking one of the speed components $Vli$ or $Vqi$, respectively, with the speed angle $\gamma i$, as it is shown in FIGS. 6 and 7. To accomplish this, it is necessary to connect one input of the circuit 5 of FIG. 6 or 7 to the output of circuit 6 rather than the corresponding output of device 1. The speed angle $\gamma i$, which may be derived from the circuit of FIG. 5, is connected, as shown in FIG. 6, with one input of a quotient former 611 via a calculating stage 25. The calculating stage 25 is programmed with the sine function.

The second input of the quotient former 611 is fed with the speed component $Vqi$ in the transverse direction $q$ of the vehicle F. FIG. 7 shows a calculating stage 20 which is programmed with the cosine function and which is also connected to an input of a quotient former 612 whose second input receives the speed component $Vli$ in the longitudinal direction $l$. The calculating stage 20 is fed the speed angle $\gamma i$. At the output of both circuits according to FIGS. 6 and 7 appears the resulting speed Vres $i$ of the vehicle F.

Figure 8:
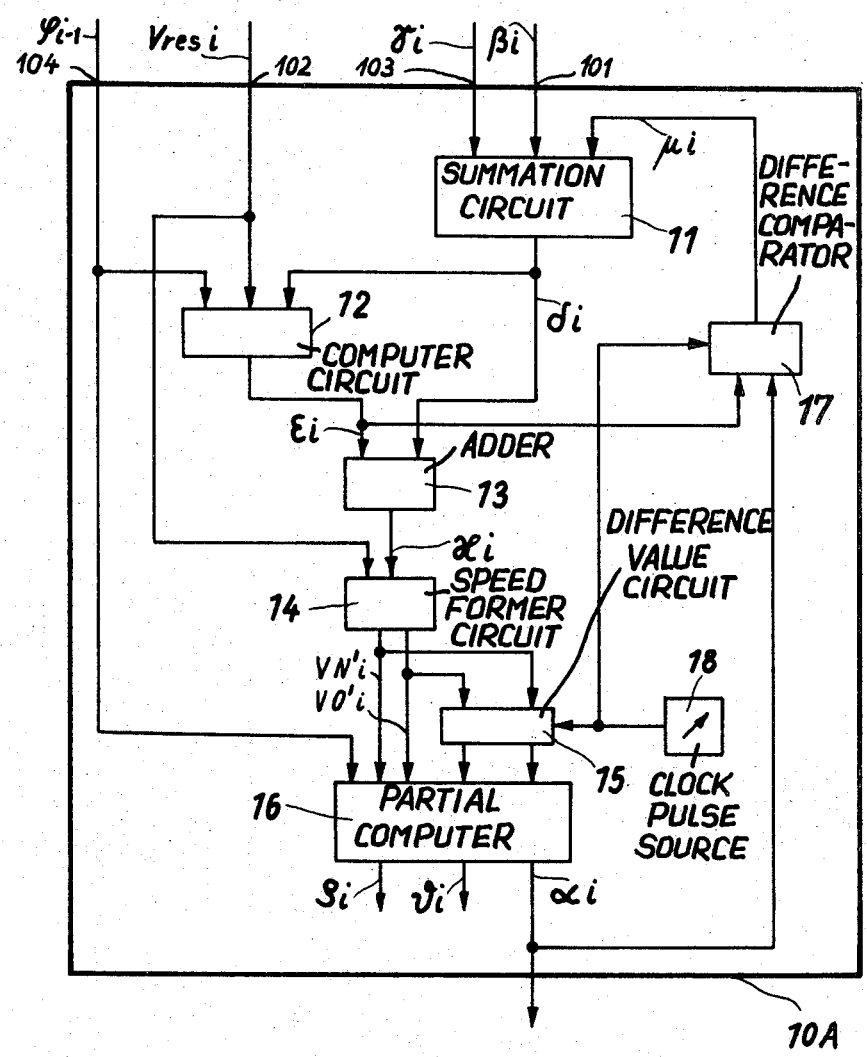
FIG. 8 is a block circuit diagram of an embodiment of the system error angle computer shown in FIG. 4.

FIG. 8 shows a preferred embodiment, generally designated 10A, of a system error angle computer usable as the computer 10 (FIG. 4). The inputs 101 and 103 to the system error angle computer 10A are connected respectively to two respective inputs of a summation circuit 11 which forms, from the north direction indication $\beta i$ and the speed angle $\gamma i$, the first auxiliary parameter $\delta i$. The other two inputs 102 and 104 to the system error angle computer 10A are connected respectively to two respective inputs of a computer circuit 12 whose third input is connected from the output of the summation circuit 11. The first system error angle, i.e. the course error $\epsilon i$, appears at the output of the computer circuit 12. This course error $\epsilon i$ and the first auxiliary parameter $\delta i$ are added together in an adder stage 13 to form the second auxiliary parameter $\chi i$.

The adder stage 13 is connected to one input of a speed former circuit 14, whose other input is connected from the input 102 to the system error angle computer 10A for determining the resulting speed Vres $i$. At two outputs of the speed former circuit 14 appear speeds $VN'i$, $VO'i$ in the approximate north direction $N'i$ and in the approximate east direction $O'i$. The two outputs of the speed former circuit 14 are connected, on the one hand, to two inputs of a difference value circuit 15 and on the other hand to two inputs of a partial computer 16. Further inputs of the partial computer 16 are connected from the two outputs of the difference value circuit 15 where accelerations $bN'i$, $bO'i$ appear in the approximate north and east directions $N'i$, $O'i$. A further input of the partial computer 16 is connected from the input 104 to the system error angle computer 10A. The partial computer 16 is programmed for the motion equations of the gyrocompass 2 employed on board the vehicle F. The system error angles $\alpha i$, $vi$, $pi$ appear at its outputs. The system error angles $pi$, $vi$ lie in the elevational plane and are required only for a correction of the north direction indication $\beta i$ in the elevational plane. Since the indication of the north direction always constitutes a projection of the figure axis $f$ of the azimuth plane, the system error angle $\alpha i$ which lies in the azimuth plane, is always used to correct the north direction indication $\beta i$ of the gyrocompass 2.

This output $\alpha i$ of the partial computer 16 is connected to a difference comparator 17 whose second input is connected from the output of the computer circuit 12 for the course error $\epsilon i$. The difference comparator 17 has a control input connected to a clock pulse generator 18 which assures that the difference $\mu i$ between the system error angle $\alpha i$ and the course error $\epsilon i$ is always formed at the beginning of a new position determination. The clock pulse generator is also connected to the difference valve circuit 15.

The clock pulse generator 18 thus determines the time interval $\tau$ which is selected in accordance with the instant circumstances. The clock pulse generator 18 can be adjusted and is set to such a time interval $\tau$ within which experience has shown that no substantial changes occur in a momentarily applicable speed Vres $i$ due to the general operating conditions for the vehicle F.

Figure 9:
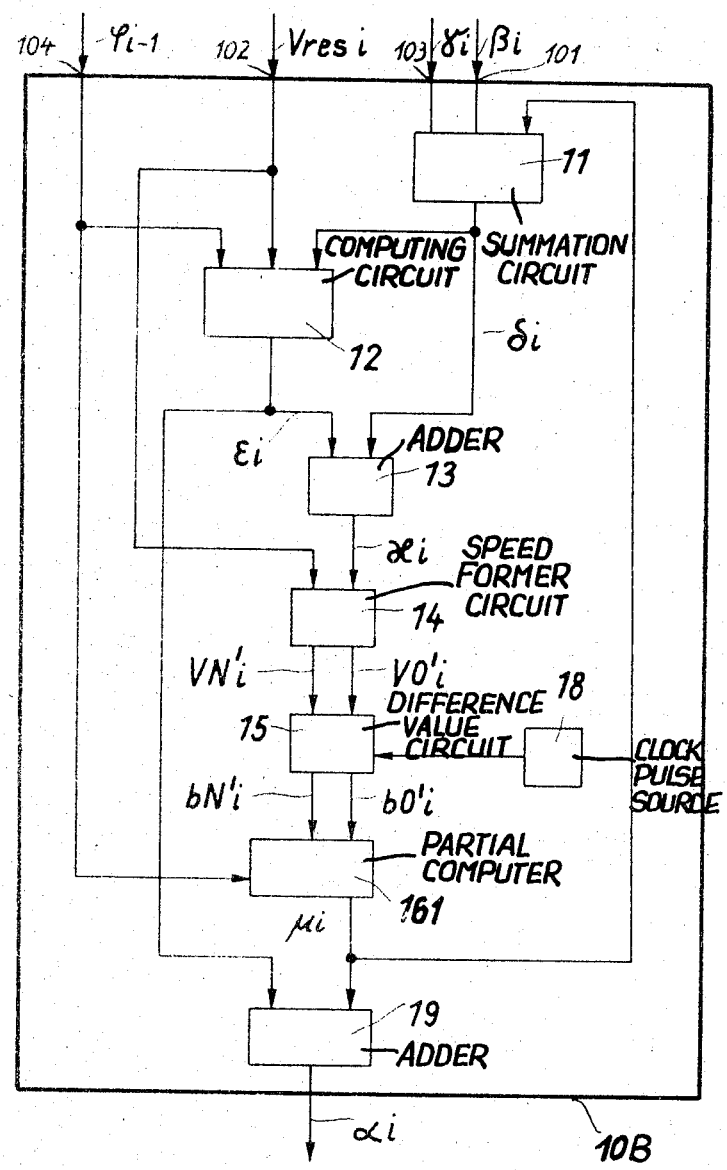
FIG. 9 is a block circuit diagram of a modified embodiment of the system error angle computer shown in FIG. 8.

FIG. 9 shows a preferred embodiment, generally designated 10B of a system error angle computer usable as the computer 10 (FIG. 4). Its input connections correspond to those described above in relation to FIGS. 4 and 8. In contradistinction to the embodiment of the system error angle computer 10A shown in FIG. 8, a modified partial computer 161 receives only the accelerations $bN'i$, $bO'i$ in the approximate north and east directions $N'i$, $O'i$ and the geographic latitude $\phi i-1$ from the input 104 to the system error angle computer 10B; thus the circuitry required for the construction of the modified partial computer 161 becomes simpler than that of partial computer 16 (FIG. 8). This modified partial computer 161 provides only a single system error angle $\mu i$ which together with the course error $\epsilon i$ furnish sufficient corrections of the north direction indication $\beta i$ in the azimuth plane for navigational requirements. The modified partial computer 161 is programmed for such motion equations for the system error angle $\mu i$ of the gyrocompass 2 which consider only accelerations in the north/south and east/west direction. For this purpose the speeds $VN'i$, $VO'i$ in the approximate north and east directions $N'i$, $O'i$ are used, as already described in connection with FIG. 5, to determine the accelerations $bN'i$, $bO'i$ in a difference value circuit 15.

A speed former circuit 14 is connected in series only with the difference value circuit 15 which is connected directly to the inputs of the modified partial computer 161. At the output of the modified partial computer 161 appears the system error angle $\mu i$. The system error angle $\mu i$ from the output of the modified partial computer 161 is fed to a first input of a series-connected adder stage 19, and added to the course error $\epsilon i$ to form the system error angle $\alpha i$. For this purpose a second input of the adder stage 19 is connected from the output of a computing circuit 12.

The output of the partial computer 161 is also directly connected with one of the three inputs of a summation circuit 11 at whose other two inputs 101, 103, as already discussed above, appear the speed angle $\gamma i$ and the north direction indication $\beta i$. Since the system error angle $\mu i$, which is dependent only on the accelerations, appears directly at the output of the modified partial computer 161, the difference stage 17 (FIG. 8) is not required in this special case. The circuit of FIG. 9 includes an adder 13, a clock pulse source 18 which correspond to circuit components shown in FIG. 8 with identical reference numerals.

Figure 10:
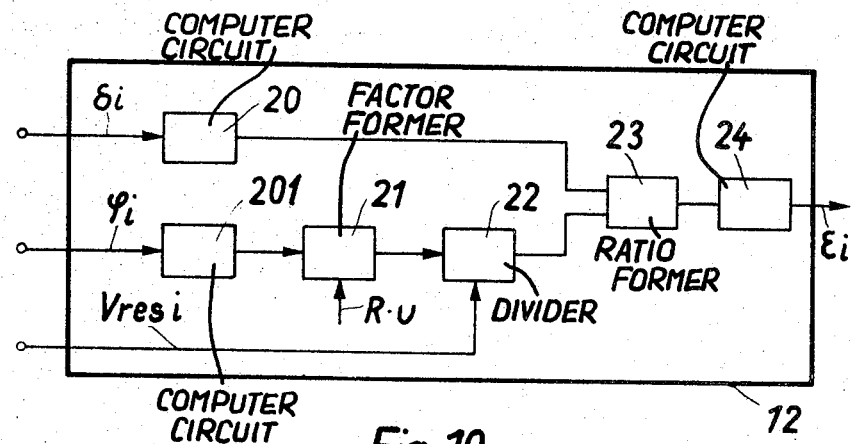
FIG. 10 is a block circuit diagram of a computer circuit for determining the course error.

FIG. 10 shows details of the computing circuit 12 within the system error angle computer 10B (FIG. 9) for developing the course error $\epsilon i$. The first input to the computing circuit 12 which provides the first auxiliary parameter $\delta i$, is connected to the input of a computer circuit 20 which is programmed with the cosine function. The second input is switched to a further computer circuit 201 which forms the cosine of the geographic latitude $\phi i$. This computer circuit 201 is series-connected to a factor forming circuit 21 which has as its permanently set factor the product of rotation speed u and radius R of the earth. This factor forming circuit 21 may be an amplifier, for example, at whose input cos $\phi i$ is present and at whose output the product $R \cdot u \cdot \cos \phi i$ can be obtained. This product is exactly equal to the peripheral speed of the earth at position $\phi i$, $\lambda i$.

The output from the factor forming circuit 21 is connected to a first input of a divider circuit 22 whose second input is fed with the resulting speed Vres i from the third input to the computing circuit 12. At the output of the divider circuit 22 there appears the quotient of the peripheral speed of the earth and the resulting speed Vres i at position $\phi i$, $\lambda i$.

The outputs from the divider circuit 22 and the computer circuit 20, supplied with the first input to the computer circuit 12, are both connected respectively to respective inputs to a ratio former circuit 23 at whose output the ratio of $\cos\delta i$ and the output signal of the divider circuit 22 is present. The ratio former circuit 23 is series-connected to a computer circuit 24 which is programmed with the arc sine function and at whose output the course error $\epsilon i$ appears as the first system error angle.

The computer circuit 12 constitutes a circuit realization of the relationships for determining the course error $\epsilon i$ known from the navigation art.

As all circuits required for performing the method of the present invention, this computer circuit 12 may be constructed in analog as well as digital technique; the individual circuits are familiar from the communications and computer art.

Figure 11:
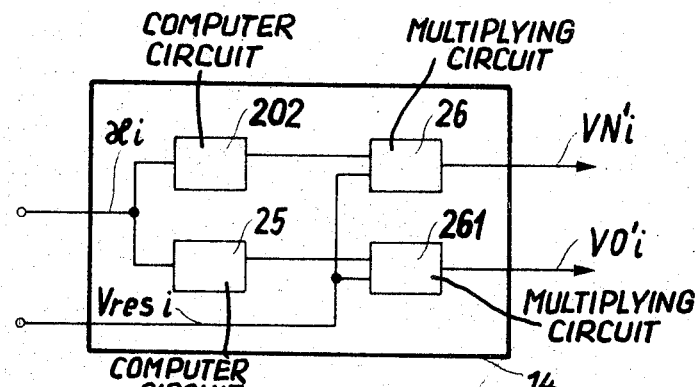
FIG. 11 is a block circuit diagram of a speed former circuit.

A circuit embodiment for the speed former circuit 14 (FIG. 9) of the system error angle computer 10B is shown in FIG. 11.

At one input to the speed former circuit 14 appears the second auxiliary paramenter $\chi i$ which is connected to one input each of two computer circuits 202, 25. The computer circuit 202 is programmed with the cosine function and the computer circuit 25 is programmed with the sine function. Outputs from each computer circuits 202, 25 are connected respectively to first inputs of a multiplying circuit 26 and a multiplying circuit 261. The other input of each of the two multiplying circuits 26, 261 is connected from the second input of the speed former circuit 14, which provides the resulting speed Vres i. At the output of the multiplying circuits 26, 261 speeds $VN'i$, $VO'i$ can be obtained in the approximate north and east directions $N'i$, $O'i$.

Figure 12:
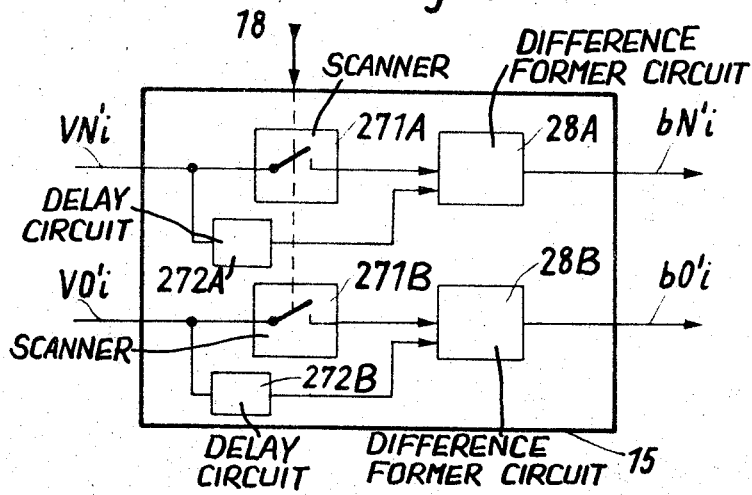
FIG. 12 is a block circuit diagram of a difference quotient circuit.

FIG. 12 shows a circuit realization for the difference value circuit 15 (FIG. 9). It includes two identically constructed circuits each including respectively a scanner 271A or 271B, a delay circuit 272A or 272B and a difference forming circuit 28A or 28B. The control input of each scanner 271A and 271B is controllably connected with the clock pulse source 18. The signal inputs of each scanner 271A and 271B are connected respectively from respective outputs of the speed former circuit 14. At the spacing of time interval $\tau$ the signal inputs of the scanners 271A and 271B are temporarily switched to respective outputs from the speed former circuit 14 under the control of clock pulse generator 18. The outputs of the scanners 271A and 271B are connected respectively to one input of the respective difference formers 28A and 28B whose second inputs are connected respectively from the signal input of the respective scanner 271A and 271B via the respective delay circuits 272A and 272B. The delay circuits 272A and 272B have a delay period which is equal to time interval $\tau$. In the difference forming circuits 28A and 28B the difference is formed between the two speeds $VN'i$, $VN'i-1$ or $VO'i$, $VO'i-1$, respectively, which are consecutive at time intervals $\tau$ at the signal inputs to the scanners 271A and 271B. The outputs of the two difference forming circuits 28A and 28B are the outputs of the difference value circuit 15 whose output signals are the accelerations $bN'i$, $bO'i$ in the approximate north and east directions $N'i$, $O'i$.

Figure 13:
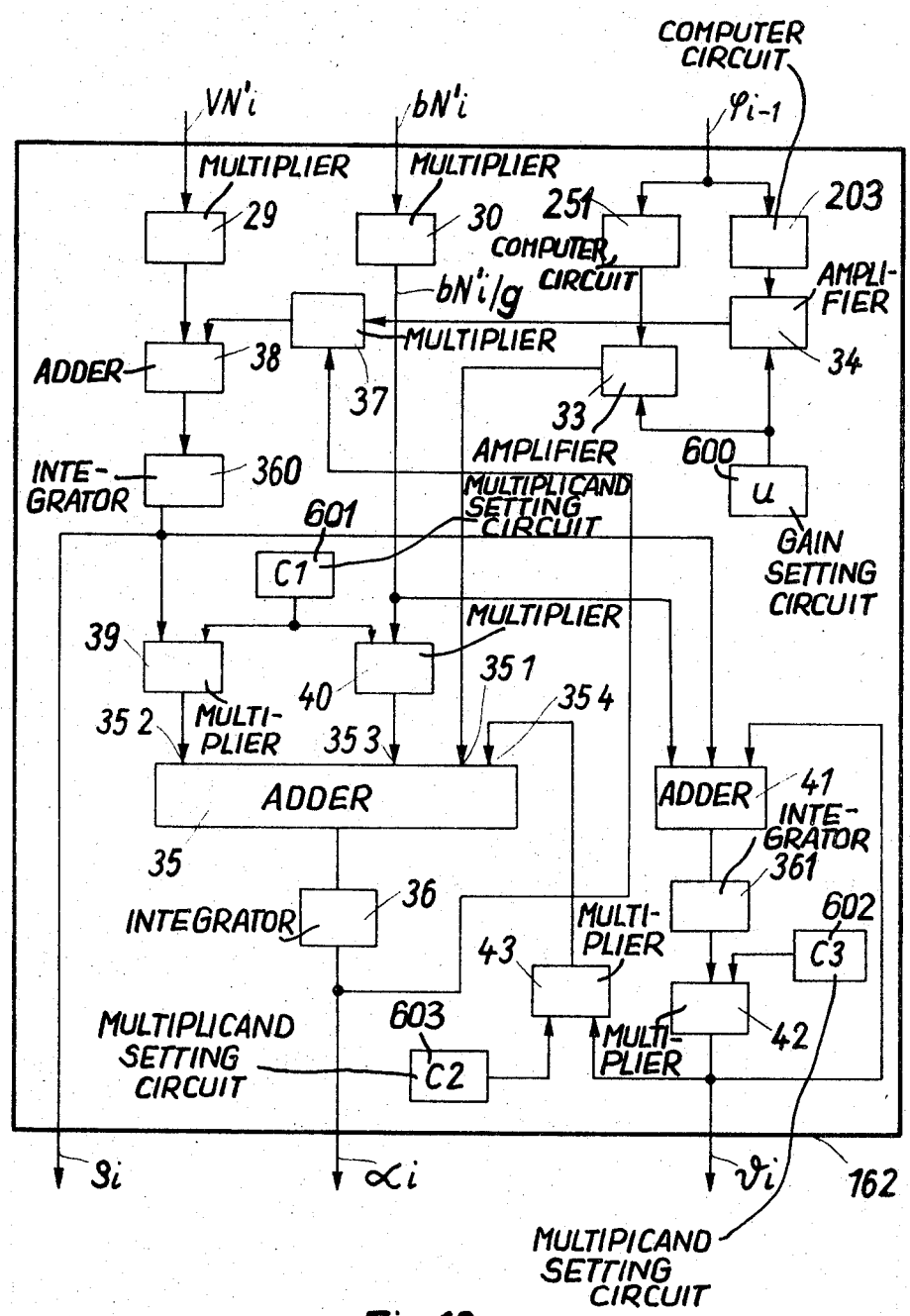
FIG. 13 is a block circuit diagram of an embodiment for the partial computer used as a circuit component of the system error angle computer shown in FIG. 8.

FIG. 13 shows a preferred embodiment of a partial computer 162 usable as the partial computer 16 (FIG. 8) for a specially designed north-seeking gyrocompass, i.e. the type of gyrocompass which is used with the so-called Anschuetz damping and Schuler period. For the Anschutz damping a viscous liquid is displaced from a vessel in order to dampen the movement of the figure axis $f$. This north-seeking gyrocompass has been accepted and found in practice for decades to be suitable for navigational purposes, and may be advantageously used in apparatuses according to the present invention which use the partial computer 162.

In this special north-seeking gyrocompass there exist three system error angles, i.e. the system error angle $\alpha i$ in the azimuth plane and the two system error angles $\rho i$ and $\nu i$, which both lie in the elevational plane. In this special embodiment of the partial computer 162 only the speeds VN'i and the accelerations bN'i in the approximate north direction N'i are considered for the partial computer 16. The motion equations for this special type of gyrocompass are described in an article by Geckeler, entitled Kreiselkompass und Schiffsmanoever (Gyrocompass and Ship's maneuvers), in Ingenieursarchiv (Engineer's Archives) Volume IV, pages 6 and 28 (1938).

In the partial computer 162 the speed VN'i in the approximate north direction N'i is fed to a first multiplier 29 which multiplies the speed VN'i in the approximate north direction N'i with the reciprocal value of the radius R of the earth, this value being permanently set internally in the first multiplier 29. The acceleration bN'i in the approximate north direction N'i is fed to a second multiplier 30 which has as its fixed internally set multiplication value the reciprocal value of the gravity $g$ of the earth. The geographic latitude $\phi i$−1 is fed to two parallel connected computer circuits (stages) 203 and 251. The computer circuit 251 is programmed with the sine function, the computer circuit 203 is programmed with the cosine function. The computer circuits 203 and 251 are connected respectively to amplifier circuits 34, 33 which both have a fixed gain corresponding to the rotation speed $u$ (velocity) of the earth, the gain being set by a conventional gain setting circuit 600. These amplifier circuits 33, 34 may be replaced by multiplier circuits. The amplifier circuit 33, which furnishes as its output the product $u \cdot \sin\phi i$−1, is connected with a first input 351 of a first adder 35 which includes three additional inputs 352, 353, 354. The first adder 35 is connected to an integrator 36. At the output of the integrator 36 there appears the system error angle $\alpha i$ in the azimuth plane.

The amplifier circuit 34, which furnishes the product $u \cdot \cos\phi i$−1, is connected to a third multiplier 37 whose second input is fed with the system error angle $\alpha i$ from the output of the integrator 36. The output of the third multiplier 37 is connected to a first input of a second adder 38 whose second input is connected from the output of the first multiplier 29. The second adder 38 is also connected in series with an integrator 360 at whose output the system error angle $pi$ in the elevational plane appears.

The output of the integrator 360, which is connected in series with the second adder 38, is connected, via a fourth multiplier 39, to the second input 352 of the first adder 35. This fourth multiplier 39 has a multiplicand C1 supplied from a multiplicand setting circuit 601. The multiplicand C1 is determined by the mechanical arrangement of the particular gyrocompass used. The third input 353 of the first adder 35 is connected from the output of a fifth multiplier 40 which receives respectively at its two inputs the output signal $bN'i/g$ from the second multiplier 30 and the multiplicand C1 from the multiplicand setting circuit 601.

The output signal $bN'i/g$ of the second multiplier 30 is also fed to one of the three inputs of a third adder 41. This third adder 41 is connected in series with an integrator 361 whose output is connected to a sixth multiplier 42. This sixth multiplier 42 has as its constant multiplicand a gyro constant C3 which is determined by the mechanical design of the particular damping of the gyrocompass used; and is supplied from a multiplicand setting circuit 602. At the output of the sixth multiplier 42 the damping dependent system error angle $vi$ can be obtained. The output of the sixth multiplier 42 is connected to the second input of the third adder 41 whose third input is fed with the system error angle $pi$ from the output of the integrator 360 which is connected in series with the second adder 38.

The system error angle $vi$ at the output of the sixth multiplier 42 is fed to an input of a seventh multiplier 43 which receives a fixed multiplicand C2 from a multiplicand setting circuit 603, the fixed value C2 being determined by the flow mechanism of the damping of the particular gyrocompass used. The output of the seventh multiplier 43 is connected to the fourth input 354 of the first adder 35.

The integrators 36, 360 and 361 all have the same integrating time which is equal to the time interval $\tau$.

At the three outputs of the partial computer 162 the three system error angles $\alpha i$, $vi$, $pi$ can be obtained. The system error angle $\alpha i$ is effectively linked to the other two system error angles $pi$, $vi$ and suited to effect a correction of the north direction indication $\beta i$ of the gyrocompass 2. All permanently programmed computer circuits of the partial computer 162 are conventional and are commercially available. Another way of verifying the solution of the motion equations for the system error angles $\alpha i$, $pi$, $vi$ is also possible, for example, by means of a digital computer which is programmed for the motion equations.

In the adder circuit 9 the system error angle $\alpha i$, the north direction indication $\beta i$ and the speed angle $\gamma i$ are added, as shown in FIG. 4, to the directional angle $\eta i$. The directional angle $\eta i$ is connected to the logic circuit 7 in the navigational computer 4 whose second input receives the resulting speed Vres $i$ from the calculating circuit 5.

Figure 14:
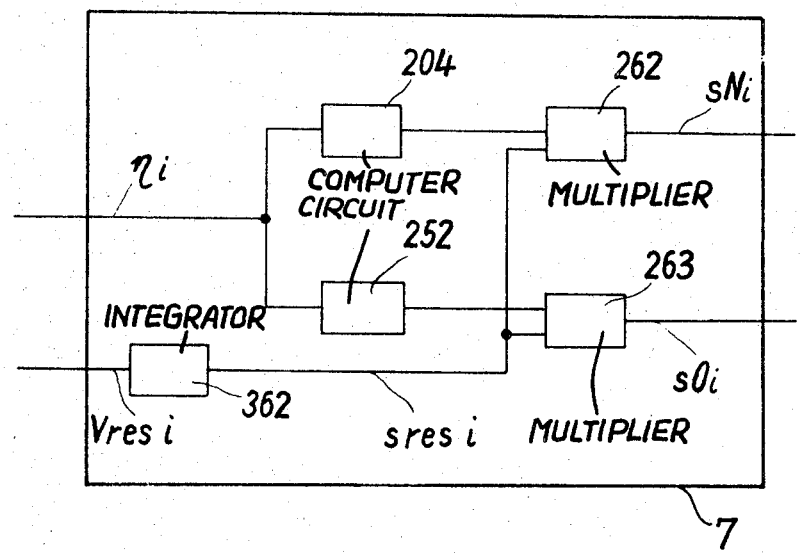
FIG. 14 is a block circuit diagram of a logic circuit.

FIG. 14 shows a circuit diagram for the logic circuit 7 (FIG. 4). At the input of logic circuit 7 for the directional angle $\eta i$ there are two computer circuits (stages) 204, 252 whose inputs are connected in parallel. The computer circuit 204 forms the cosine of the directional angle $\eta i$, the computer stage 252 forms the sine of the directional angle $\eta i$. The other input of the logic circuit 7 is provided with an integrator 362, which integrates the resulting speed Vres i over the time interval $\tau$ to the resulting path sres $i$. The output of the integrator 362 is connected to one input each of two multiplier circuits 262, 263. The output of computer circuit 252 is connected to the free input of the multiplier circuit 263, the output of the computer circuit 204 is connected to the free input of the other multiplier circuit 262. At the output of respective multiplier circuits 262, 263, path components $sNi$ and $sOi$, respectively, in the north/south and east/west directions N, O, respectively, can be obtained which are fed to the summing circuit 8.

In the summing circuit 8 (FIG. 4) the path component $sNi$ in the north/south direction N is added to the geographic latitude $\phi o$ of the starting position $\phi o$, $\lambda o$ and the path component $sOi$ in the east/west direction O is added to the geographic longitude $\lambda o$. At the output of the summing circuit 8 there then appears the momentary position $\phi i$, $\lambda i$ of the vehicle F.

Figure 15:
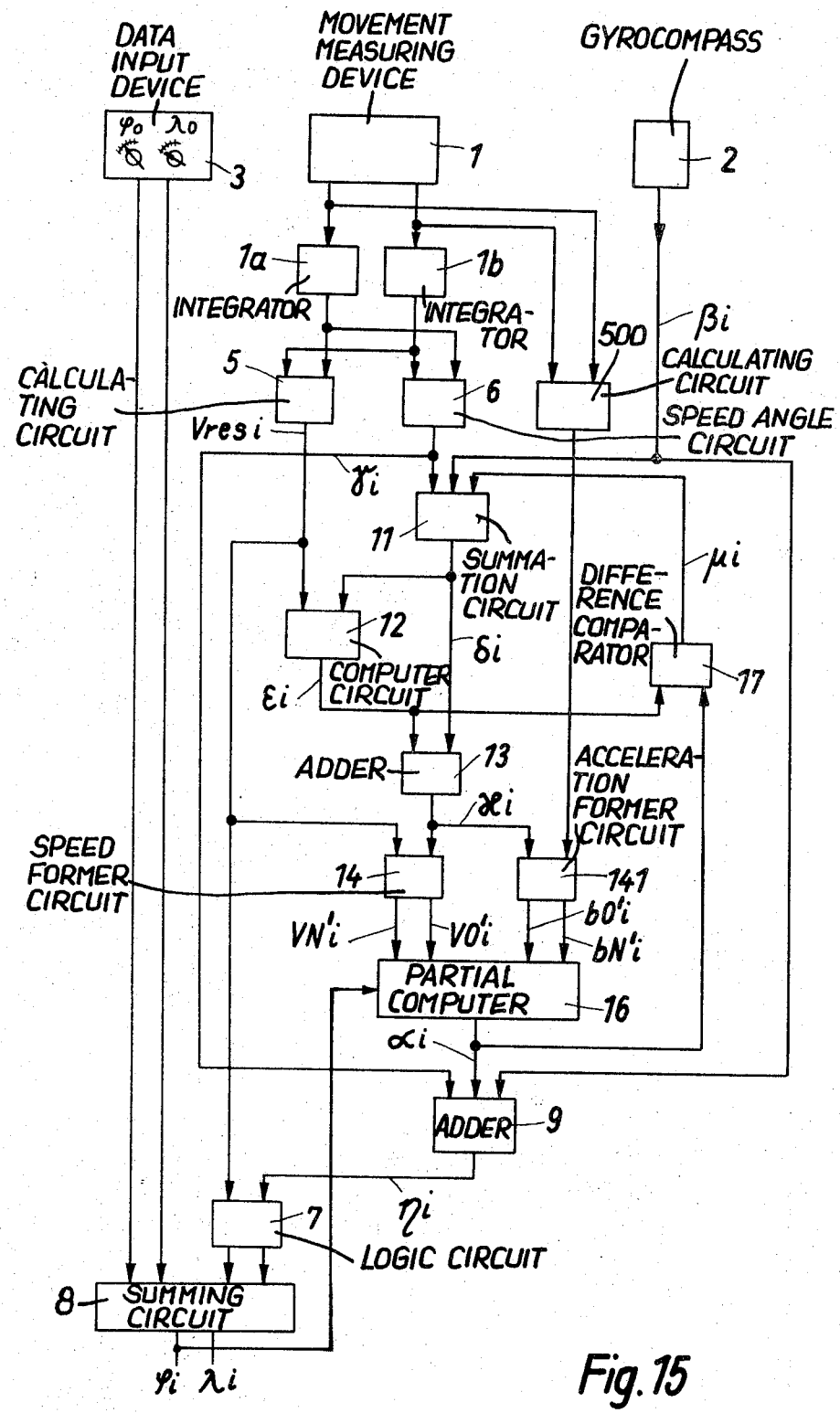
FIG. 15 is a modified block circuit diagram of the apparatus illustrated in FIG. 4.

FIG. 15 shows a modified block circuit diagram of the apparatus according to a preferred embodiment of the present invention. The movement measuring device 1, 1a, 1b, as in the embodiment shown in FIG. 4, receives acceleration components in the longitudinal and transverse directions $l$, $q$ of the vehicle F. According to a further preferred feature of the present invention as illustrated in FIG. 15, the difference value circuit 15 (FIG. 9) is replaced by a further calculating circuit 500, which forms the resulting acceleration of the vehicle F from the vehicle-related acceleration component, and a series-connected acceleration former circuit 141 which receives at its second input the second auxiliary parameter $\chi i$ from the adder 13. The acceleration former circuit 141 is identically constructed as the speed former circuit 14 (FIG. 11). At its outputs the accelerations $b\text{N}'i$, $b\text{O}'i$ in the approximate north and east directions $\text{N}'i$, $\text{O}'i$ can be obtained, which accelerations are fed, as described in connection with FIG. 8, to the partial computer 16. The remaining circuit elements shown in FIG. 15 correspond in structure and function to those having the same reference numerals as the embodiments discussed above.

Finally it should be stated that the error influences in the north direction indication of the north-seeking gyrocompass which have been known from physics for a long time were hardly every annoying as long as the vehicle did not customarily perform any abrupt movements in which the exact momentary position always had to be known. However, when traveling back and forth, for example, between two geographically fixed points on one and the same path, system error angles in the north direction indication of the gyrocompass can no longer be neglected but have a decisive influence on the position determination. It has been possible, for example in surveying work for ocean research, to develop extremely accurate movement measuring devices which, however, could hardly find the proper application because the information required for the position determination with respect to the geographic north direction was available only with insufficient accuracy.

The present invention shows, however, how highly qualified positioning problems can also be solved with a north-seeking gyrocompass in its most simple construction, even if moments act on the gyrocompass which are a result of vehicle movements, without there being a need for interfering with the mechanical operation of the gyrocompass. To accomplish this, the present invention provides that correction values be derived from the available measured values for the path determination, which values are evaluated through motion equations for the system error angles of the gyrocompass as they are known from gyrophysics. The circuitry required for this purpose in addition to the conventional navigational computer is of no significance in view of the attained accuracy. The surprising result of the present invention is that the system error angles, which previously have been considered unavoidable can be overcome by relatively simply determinable and useful correction values so that accurate position determinations are always and quasi continuously possible.

The present invention is described herein for the embodiment of the north-seeking gyrocompass. The motion equations for gyrocompasses, however, can also be applied to space stabilized gyro systems which are not oriented to the geographic north direction, see Reed, General Formulation and Computer, Volume II, The University of Alabama in Huntsville (April, 1971). The basic idea of the present invention can be used in the same manner and with the corresponding success for such space stabilized gyro systems.

The applicability of the motion equations of the gyrocompass which have been known in theory for decades is disclosed for the first time in the present invention whose central idea is the definition of an approximate north direction from easily attainable measured values and to use this approximate north direction to produce a correction value for the north direction indication of the gyrocompass. Only with this method step as provided by the present invention has it become possible to overcome the theoretically long known drawbacks of the conventional gyrocompass systems with the simplest technical means, without interference in the mechanical operation of the gyrocompass and without additional complicated movement measurement generating systems of the highest precision.

It will be understood that the above description of the present invention is susceptible to various modifications, changes and adaptations and the same are intended to be comprehended within the meaning and range of the equivalents of the appended claims.

I claim:

1. In apparatus to be mounted on a vehicle for producing signals indicative of the position of the vehicle relative to a known starting position, which apparatus includes: means for developing successive signals representing components of the motion of the vehicle in longitudinal and transverse directions during successive intervals; north-seeking gyrocompass means for producing a north direction indication signal; data input means for supplying signals indicative of such known starting position of the vehicle; and navigational computer means for producing signals indicative of the momentary position of the vehicle for each of the successive signals representing vehicle motion components, said computer constituting means for processing trigonometric functions and having first input means coupled to said means for developing successive signals representing vehicle motion components for receiving such signals and second input means coupled to said data input means for receiving signals indicative of the known starting position of the vehicle, the improvement wherein:

said navigational computer means comprises:

a. calculating circuit means connected to said first input means for receiving the successive signals representing vehicle motion components and for producing therefrom signals representing the resulting speed of the vehicle at such successive intervals;

b. speed angle circuit means connected to said first input means for receiving the successive signals representing vehicle motion components and for producing therefrom signals representing the speed angle of the vehicle at such successive intervals;

c. a logic circuit having first and second inputs, with said first input being connected to said calculating circuit means to receive the signals produced thereby and said second input being arranged to receive a signal indicative of the true directional angle of the vehicle movement, said logic circuit having first and second outputs and constituting means for deriving, from the signals at its inputs, a signal at its first output representative of the vehicle path component in the east/west direction and a signal at its second output representative of the vehicle path component in the north/south direction;

d. a summing circuit having first inputs connected to said second input means of said navigational computer means for receiving the signals supplied by said data input means, and second inputs connected to the first and second outputs of said logic circuit for receiving the signals produced thereby, said summing circuit having output means at which appear signals indicative of at least one component of the present position of the vehicle;

and said apparatus further comprises:

system error angle computer means having a first input coupled to said gyrocompass means for receiving the signal produced thereby, a second input connected to the output of said calculating circuit means to receive the signals produced thereby, a third input connected to the output of said speed angle circuit means to receive the signals produced thereby and a fourth input connected to said output means of said summing circuit to receive the signals appearing at such output, said system error angle computer constituting means for operating according to known gyrophysical motion equations in order to derive, from the signals supplied to its inputs, output signals representing the system error angle associated with said gyrocompass means;

addition circuit means having a first input connected to said gyrocompass means for receiving the signal produced thereby, a second input connected to said system error angle computer means for receiving the output signals produced thereby, and a third input connected to said speed angle circuit means for receiving the signals produced thereby, said addition circuit means combining the signals at its said inputs to produce at its output a signal indicative of the true directional angle of the vehicle movement, the output of said addition circuit means being connected to the second input of said logic circuit.

2. An apparatus as defined in claim 1 wherein said speed angle circuit means includes: a quotient former having its two inputs respectively connected to outputs of said means for developing motion representing components; and a calculating circuit coupled to said quotient former and responsive to signals therefrom, said calculating circuit constituting an arc tangent function generator, the signal being furnished from the output of said speed angle circuit means being the momentary speed angle signal.

3. An apparatus as defined in claim 1 wherein said means for developing motion representing components has two outputs, and said calculating circuit means constitutes means for forming a geometric sum and includes one output and two inputs, each of said inputs being connected to a respective one of said outputs of said means for developing motion representing components, the signals representative of the momentary resulting speed of the vehicle appearing at said output of said calculating circuit means.

4. An apparatus as defined in claim 1 wherein said means for developing motion representing components includes an output for a speed representing component in the transverse direction of said vehicle, and said calculating circuit means, which forms the signals representative of the resulting speed, includes a quotient former, having first and second inputs and an output, and a trigonometric computing circuit constituting a sine function generator, said trigonometric computing circuit being connected at its input to the output of said speed angle circuit means and at its output to said first input of said quotient former, said second input of said quotient former being connected to said output for the speed representing component in the transverse direction.

5. An apparatus as defined in claim 1 wherein said means for developing motion representing components includes an output for a speed representing component in the longitudinal direction of the vehicle, and said calculating circuit means includes a quotient former having first and second inputs and an output, and a trigonometric computing circuit constituting a cosine function generator, said trigonometric computing circuit being connected at its input to the output of said speed angle circuit means and at the output to said first input of said quotient former, said second input of said quotient former being connected to said output for the speed representing component in the longitudinal direction.

6. An apparatus as defined in claim 1 wherein said summing circuit of said navigational computer means produces geographic latitude representing signals at its said output means and said system error angle computer means includes:

summation circuit means for forming a first auxiliary parameter, said summation circuit means being connected at its input to the output from the speed angle circuit means and to the output from said gyrocompass;

a computer circuit means for forming the course error as the first system error angle, and having a first input connected to the output of said summation circuit means, a second input connected to said output means of said summing circuit in said navigational computer means for the geographic latitude representing signals, and a third input connected to the output of said calculating circuit means;

adder means for forming a second auxiliary parameter and having an input connected to the output of said summation circuit means and the output from said computer circuit means;

speed former circuit means for forming the speed representations in he approximate north direction and in the approximate east direction and having two inputs connected respectively to the output of said adder means and the output of said calculating circuit means;

a partial computer means having two inputs directly connected respectively to two outputs of said speed former circuit means and having two further inputs indirectly connected to said two outputs of said speed former circuit means, via a difference value circuit, and having a last input connected to the output of said summing circuit in said navigational computer means, said partial computer having outputs at which appear representations of the azimuthal system error angle, the speed angle and the north direction indication of said gyrocompass and which together define the true directional angle; and a difference comparator having a first input connected to the output of said partial computer which provides the azimuthal system error angle, and a second input connected to the output of said computer circuit means, the output of said difference comparator being connected to further input of said summation circuit means to form the first auxiliary parameter.

7. An apparatus as defined in claim 6 wherein said computer circuit means is a delta device for developing the course error as the first system error angle.

8. An apparatus as defined in claim 6 wherein said computer circuit means comprises a ratio former having two inputs, a factor former, divider circuit means, and an arc sine function circuit, and wherein the first input of said computer circuit means includes a computer circuit constituting a cosine function generator and whose output is connected to one input of said ratio former; the second input of said computer circuit means includes a computing circuit constituting a cosine function generator and connected at its output to said factor former, which calculates the peripheral speed of the earth for the position of the vehicle as a product of the rotational speed and radius of the earth, which are fixed factors in said factor former, and the cosine of the geographic latitude; and the output of said factor former and a third input of said computer circuit means are connected to two inputs of said divider circuit means whose divisor is the resulting speed of the vehicle and whose dividend is the peripheral speed of the earth, the output of said divider circuit means being connected to the other input of said ratio former, to which is connected in series said arc sine function circuit, the course error being obtained as the first system error angle at the output of said function circuit.

9. An apparatus as defined in claim 6 wherein said speed former circuit means includes: at its first input for the second auxiliary parameter, a computer circuit constituting a cosine function generator, and a computer circuit constituting a sine function generator; a first multiplying circuit having one input connected to the output of said first computer circuit and a second multiplying circuit having one input connected to the output of said second computer circuit, the second input of said speed former circuit means constituting the second input of both said multiplying circuits and being connected to the output of said calculating circuit means, the speeds of the vehicle being obtained in the approximate north direction and in the approximate east direction at the respective outputs of said speed former circuit, these being constituted, respectively, by the outputs of said multiplying circuits.

10. An apparatus as defined in claim 9 wherein said means for developing motion representing components comprise: acceleration former circuit means structurally identical to said speed former circuit means; an additional calculating circuit means; and accelerometer means, and wherein said partial computer means is connected at its input to the outputs of said speed former circuit means to receive signals indicative of the speeds in the approximate north and east directions and additionally to the outputs of said acceleration former circuit means, one input of said acceleration former circuit means is connected to the output of said adder means to receive a signal therefrom representative of the second auxiliary parameter and another of its inputs is connected to an output of said additional calculating circuit means, and the inputs of said additional calculating circuit means are connected to receive the acceleration components in the longitudinal and transverse directions of the vehicle to form a signal representative of the resulting acceleration of the vehicle.

11. An apparatus as defined in claim 6, wherein said difference value circuit includes: a delay means producing a time delay corresponding to a set time interval; and two identical circuits, each comprising a scanner which scans, at a given rate each cycle of which is equal to the set time interval, the momentary speeds at the respective outputs of said speed former circuit; and a difference former circuit which is connected respectively at one of its inputs directly to said scanner and at the other of its inputs, via said delay means, to a respective one of the outputs of said speed former circuit, the accelerations in the approximate north and east directions of the vehicle being obtained at the respective outputs of each of said identical circuits as the respective outputs of said difference value circuit.

12. An apparatus as defined in claim 11 wherein said gyrocompass means is a north-seeking gyrocompass having Anschutz damping and wherein said partial computer means includes a first multiplier having one input connected to receive a signal representing vehicle speed in the approximate north direction, said first multiplier having a second input which provides a representation of the value of the reciprocal of the radius of the earth as a fixed multiplication value signal;

a second multiplier having one input connected to receive a signal representing acceleration in the approximate north direction, said second multiplier having a second input which provides a representation of the value of the reciprocal of the gravity of the earth as its multiplication value signal;

a first computer circuit constituting a sine function generator, a second computer circuit constituting a cosine function generator, coupled from said summing circuit and responsive to signals therefrom representing geographic latitude, and first and second amplifier circuits each having an amplification factor equal to the rotational speed of the earth, the input of said first amplifier circuit being connected to the output of said first computer circuit and the input of said second amplifier circuit being connected to the output of said second computer circuit;

a first adder having a plurality of inputs, with a first of said inputs being connected to the output of said first amplifier circuit;

a first integrator having its input connected to the output of said first adder for produding an output signal representing the system error angle in the azimuth plane;

a third multiplier having one imput connected to the output of said second amplifier circuit;

a second adder having a first input connected to the output of said third miltiplier and a second input connected to the output of said first multiplier;

a second integrator having its input connected to the output of said second adder for producing an output signal representing the system error angle in the elevational plane;

a fourth multiplier having one input connected to the output of said second integrator and having its output connected to a second input of said first adder;

a fifth multiplier having one input connected to the output of said second multiplier and having its output connected to a third input of said first adder;

first setting means connected to a second input of each of said fourth and fifth multipliers for supplying thereto a constant value multiplicand signal representing the mechanical characteristics of said gyrocompass;

a third adder having three inputs and an output, with the first of its inputs being connected to the output of said second multiplier and the second of its inputs being connected to the output of said second integrator;

a third integrator having its input connected to said third adder output;

a sixth multiplier having one input connected to the output of said third integrator and having its output connected to the third of the inputs of said third adder;

second setting means connected to a second input of said sixth multiplier for supplying thereto a gyro-constant value multiplicand signal representing the damping characteristics of said gyrocompass;

a seventh multiplier having one input connected to the output of said sixth multiplier and having its output connected to a fourth input of said first adder; and third setting means connected to a second input of said seventh multiplier for supplying thereto a constant value multiplicand signal representing the design of the damping of said gyrocompass;

wherein the output from said sixth multiplier is a signal representing the system error angle and all of said integrators possess the same integration time which is equal to the set time interval.

13. An apparatus as defined in claim 1, wherein:

said logic circuit comprises a first computer circuit constituting a sine function generator, a second computer circuit constituting a cosine function generator, an integrator, a first multiplier and a second multiplier; and said second input of said logic circuit is connected to the input of each of said computer circuits; said first input of said logic circuit means is connected between the output of said calculating circuit means and the input to said integrator; the output of said integrator is connected to a first input of each of said multipliers; the output of each said computer circuit is connected to a second input of a respective one of said multipliers, the output from said first multiplier is connected to a first input of said summing circuit for feeding thereto a signal representative of the path component in the east/west direction; and the output from said second multiplier is connected to a second input of said summing circuit for feeding thereto a signal representative of the path component in the north/sourth direction thereto.

14. An apparatus as defined in claim 1 wherein said summing circuit of said navigational computer means produces geographic latitude representing signals at its said output means, and said system error angle computer means includes:

summation circuit means for forming a first auxiliary parameter, said summation circuit having a plurality of inputs, one of which is connected to the output from the speed angle circuit means and a second of which is connected to the output from said gyrocompass;

a computer circuit means for forming the course error as the first system error angle, and having a first input connected to the output of said summation circuit means, a second input connected to said output means of said summing circuit in said navigational computer means for the geographic latitude representing signals, and a third input connected to the output of said calculating circuit means;

adder means for forming a second auxiliary parameter and having an input connected to the output of said summation circuit means and the output from said computer circuit means;

speed former circuit means for forming the speed representations in the approximate north direction and in the approximate east direction and having two inputs connected respectively to the output of said adder means and the output of said calculating circuit means;

a partial computer means having two inputs directly connected, respectively, to two outputs of said speed former circuit means, and having a third input connected to said output means of said summing circuit in said navigational computer means for receiving a signal therefrom representative of geographic latitude, said partial computer having an output at which appears a representation of a single system error and which is connected directly to a further input of said summation circuit means; and an adder circuit means having a first input connected to the output from said partial computer means, a second input connected to the output of said computer circuit means and an output at which appears a signal representation of the system error angle.

* * * * *